(12) United States Patent
Zheng et al.

(10) Patent No.: US 9,087,106 B2
(45) Date of Patent: Jul. 21, 2015

(54) BEHAVIOR TARGETING SOCIAL RECOMMENDATIONS

(75) Inventors: Hao Zheng, Beijing (CN); Xianyu Zhao, Beijing (CN); Peng Liu, Beijing (CN)

(73) Assignee: YAHOO! INC., Sunnyvale, CA (US)

( * ) Notice: Subject to any disclaimer, the term of this patent is extended or adjusted under 35 U.S.C. 154(b) by 1 day.

(21) Appl. No.: 13/381,863

(22) PCT Filed: Dec. 31, 2010

(86) PCT No.: PCT/CN2010/080655
§ 371 (c)(1),
(2), (4) Date: Dec. 30, 2011

(87) PCT Pub. No.: WO2012/088720
PCT Pub. Date: Jul. 5, 2012

(65) Prior Publication Data
US 2013/0304731 A1    Nov. 14, 2013

(51) Int. Cl.
*G06F 17/30* (2006.01)
*G06Q 30/02* (2012.01)
*G06Q 50/00* (2012.01)

(52) U.S. Cl.
CPC ........ *G06F 17/3053* (2013.01); *G06Q 30/0201* (2013.01); *G06Q 30/0282* (2013.01); *G06Q 50/01* (2013.01)

(58) Field of Classification Search
CPC ................... G06F 17/30867; G06F 17/30702; G06F 17/30699
USPC .......................... 707/723, 728, 732, 733, 734
See application file for complete search history.

(56) References Cited

U.S. PATENT DOCUMENTS

| | | | |
|---|---|---|---|
| 6,249,282 B1* | 6/2001 | Sutcliffe et al. | 715/751 |
| 7,680,703 B1* | 3/2010 | Smith | 705/26.8 |
| 2009/0228513 A1* | 9/2009 | Tian | 707/102 |
| 2010/0049770 A1* | 2/2010 | Ismalon | 707/765 |
| 2010/0235375 A1* | 9/2010 | Sidhu et al. | 707/765 |
| 2010/0257160 A1* | 10/2010 | Cao | 707/723 |
| 2010/0312724 A1* | 12/2010 | Pinckney et al. | 706/11 |
| 2011/0153412 A1* | 6/2011 | Novikov et al. | 705/14.42 |
| 2011/0173198 A1* | 7/2011 | Malleshaiah et al. | 707/737 |
| 2011/0191352 A1* | 8/2011 | Jones et al. | 707/749 |

FOREIGN PATENT DOCUMENTS

| | | |
|---|---|---|
| CN | 101105795 A | 1/2008 |
| CN | 101753573 A | 6/2010 |

OTHER PUBLICATIONS

International Search Report and Written Opinion mailed Oct. 20, 2011 for PCT Application No. PCT/CN2010/080655.

* cited by examiner

*Primary Examiner* — Rehana Perveen
*Assistant Examiner* — Robert F May
(74) *Attorney, Agent, or Firm* — James J. DeCarlo; Greenberg Traurig, LLP

(57) ABSTRACT

A process for generating social recommendations is provided. For each user, a user profile index is accessed to determine reading interests of the user. Further, relevance matching is performed to determine matching users having at least one publishing interest that is relevant to the reading interests of the user. Next, the matching users are ranked. Based on the ranking, one or more top ranked matching user(s) are determined. Additionally, a social recommendation for each of the top ranked matching user(s) is enabled to be made to the user.

20 Claims, 5 Drawing Sheets

BEHAVIOR TARGETING SOCIAL RECOMMENDATIONS

CROSS-REFERENCE TO RELATED APPLICATIONS

This patent application is a U.S. national phase of International Patent Application No. PCT/CN2010/080655, filed on Dec. 31, 2010; the benefit of which is claimed and the contents of which are incorporated herein by reference in its entirety.

TECHNICAL FIELD

The present invention relates generally to computer networks and, more particularly, but not exclusively to a method, apparatus, and manufacture for generating social recommendations based on matching private online behavior with published content.

BACKGROUND

Conventional social network connections are mainly a mirror of real world relationships. This method has several drawbacks. Such a method is in principle copying the real world connection into an online community. The social graph can become noisy and stale if suggestions keep being made based on friends' friends. Further, this conventional method lacks effective suggestions for those users outside of the social network.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, in which.

DETAILED DESCRIPTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, the invention is related to a process for generating social recommendations. For each user, a user profile index is accessed to determine reading interests of the user. Further, relevance matching is performed to determine matching users having at least one publishing interest that is relevant to the reading interests of the user. Next, the matching users are ranked. Based on the ranking, one or more top ranked matching user(s) are determined. Additionally, a social recommendation for each of the top ranked matching user(s) is enabled to be made to the user.

Illustrative Operating Environment

Figure 1:
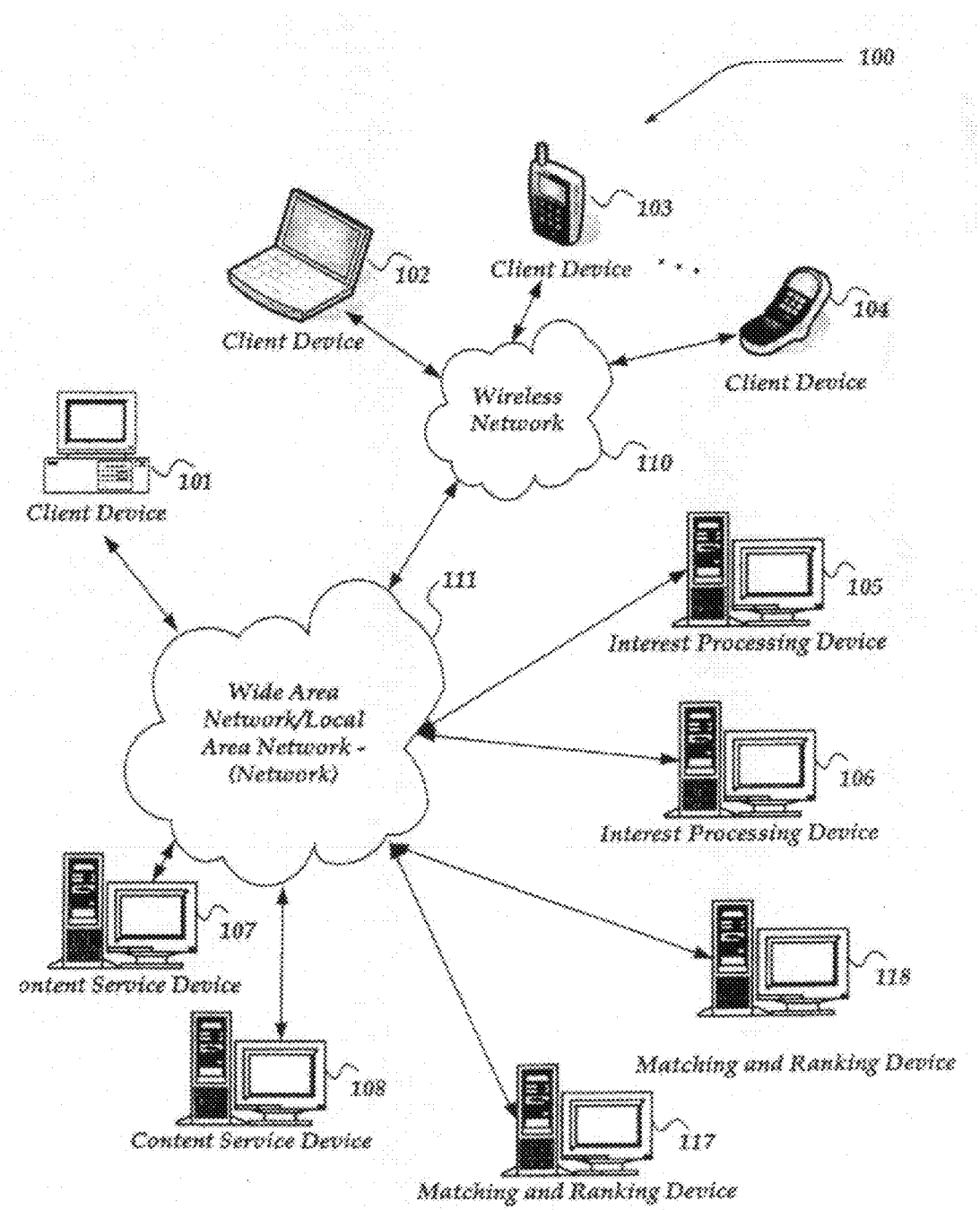
FIG. 1 illustrates a system diagram of one embodiment of an environment in which the embodiments of the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs") wide area networks ("WANs")—(network) 111, wireless network 110, client devices 101-104, content service devices 107-108, interest processing devices 105-106, and matching and ranking devices 117-118.

One embodiment of client devices 101-104 is described in more detail below in conjunction with FIG. 2. Generally, however, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

Client device 101 may include virtually any computing device capable of communicating over a network to send and receive information, including social networking information, performing various online activities, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 102-104 may operate over wired and/or wireless network.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the client device may employ the browser application to perform various activities over a network (online). For example, the user of the client device may select to manage various web postings, such as blog postings, postings of articles, posting of photographs, and or other images, video content, audio content, or the like. Similarly, the user of the client device may also employ the browser application to access postings by others, including textual postings, web pages, blogs, news articles, images, and/or any of a variety of other content accessible over networks 110-111. Furthermore, the browser application may allow a user to conduct any of a variety of search queries for content accessible over networks 110-111. However, another application may also be used to perform various online activities.

For example, client devices 101-104 also may include at least one other client application that is configured to receive and/or send content, including User Generated Content (UGC), between another computing device. The client application may include a capability to provide and receive textual content, graphical content, audio content, and the like. The client application may further provide information that identifies itself, including a type, capability, name, and the like. In one embodiment, client devices 101-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent between other client devices, content service devices 107-108, or other computing devices.

Client devices 101-104 may further be configured to include a client application that enables an end-user to log into an end-user account that may be managed by another computing device, such as content service devices 107-108, or the like. Such end-user account, for example, may be configured to enable the end-user to manage one or more online activities, including for example, search activities, social networking activities, browse various websites, make purchases, sell products/services, communicate with other users, or share content with others, or the like. However, participation in such online networking activities may also be performed without logging into the end-user account.

Moreover, client devices 101-104 may be configured to operate to send messages, and other content for posting through and/or on a content service device, such as 107-108. That is, in one embodiment, a user of client devices 101-104 may select to create and/or otherwise post content within a blog, webpage, or the like, hosted by, e.g., content service devices 107-108.

Wireless network 110 is configured to couple client devices 102-104 and its components with network 111. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including $2^{nd}$ (2G), $3^{rd}$ (3G), $4^{th}$ (4G), $5^{th}$ (5G) generation radio access for cellular systems, WLAN, Wireless Router (WR) mesh, and the like. Access technologies such as 2G, 3G, 4G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 111 is configured to couple network devices with other computing devices, including, content service devices 107-108, interest processing devices 105-106, matching and ranking devices 117-118, and client devices 101, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Content service devices 107-108 are network devices usable to operate as website servers to provide content to client devices 101-104. In various embodiments, such content may include, but is not limited to webpage content, advertisements, professionally generated content (non-UGC content), search results, blogs, and/or any of a variety of User Generated Content for access by another client device. For example, in one embodiment, content services devices 107-108 might include one or more search engines configured to allow a user to perform network searches for various content.

Content service devices 107-108 may also operate as a messaging server such as an SMS message service, IM message service, email message service, alert service, or the like. Moreover, content service devices 107-108 may also operate as a File Transfer Protocol (FTP) server, a database server, music and/or video download server, or the like. Additionally, content service devices 107-108 may be configured to perform multiple functions.

In some embodiments, various content service devices (e.g., 107-108) may act as serving computers for various properties on a network. For example, the network may have various properties of interest to users such as mail, travel, sports, news, finance, and the like. Content service devices (e.g., 107-108) may allow a user to log on to the network. Further, content service devices (e.g., 107-108) may gather information on user behavior, including private user behavior such as page views, ads views, ad clicks, and search queries. Content service devices (e.g., 107-108) may also gather information from users regarding public content generated by the user, such as a user's past blogs, tweets, UGC, and other published user information.

In one embodiment, a user of client devices 101-104 may perform the search-queries, through, for example, a search engine resident on content service devices 107-108.

One embodiment of interest processing devices 105 and 106 is described in more detail below in conjunction with FIG. 3. Briefly, however, interest process devices 105 and 106 represent one or more network devices configured to receive user information gathered from content service devices (e.g., 107 and 108), create a user profile for each user including reading interests for each user based on the gathered private information, and index the user profiles. Further, interest processing devices 105 and 106 may perform actions such as receiving the gathered information regarding public content generated by users, performing offline modeling, and indexing publishing interested based on the gathered information on the public content, as discussed in greater detail below.

One embodiment of matching and ranking devices 117 and 118 is described in more detail below in conjunction with FIG. 3. Briefly, however, matching and ranking devices 117 and 118 represents one or more network devices configured to performing matching and ranking functions. For example, matching and ranking devices 117 and 118 may be configured to receive information from the indexes of interest processing devices 107 and 108, and, relevant matches found between users' reading interest and other users with relevant publishing interest. After the matches are obtained, matching and ranking devices 117 and 118 may ranking the results and determine the top ranked results. These top ranked results may be provided to the content service devices (e.g., 107-108) to provide social recommendation to users, such as friend suggestions and/or suggestions to follow the user. In some embodiments, a single device may perform both matching and ranking devices. In other embodiments, some devices perform matching and other devices perform ranking.

Devices that may operate as content servers 107-108, interest processing devices 105-106, and matching and ranking devices 117-118 include various network devices, including, but not limited to personal computers, desktop computers, multiprocessor systems, microprocessor-based or programmable consumer electronics, network PCs, server devices, network appliances, and the like. It should be noted that while various devices such as matching and ranking devices 117-118 are shown as two devices, in various embodiments there more be only one such device or three or more devices.

Illustrative Client Device

Figure 2:
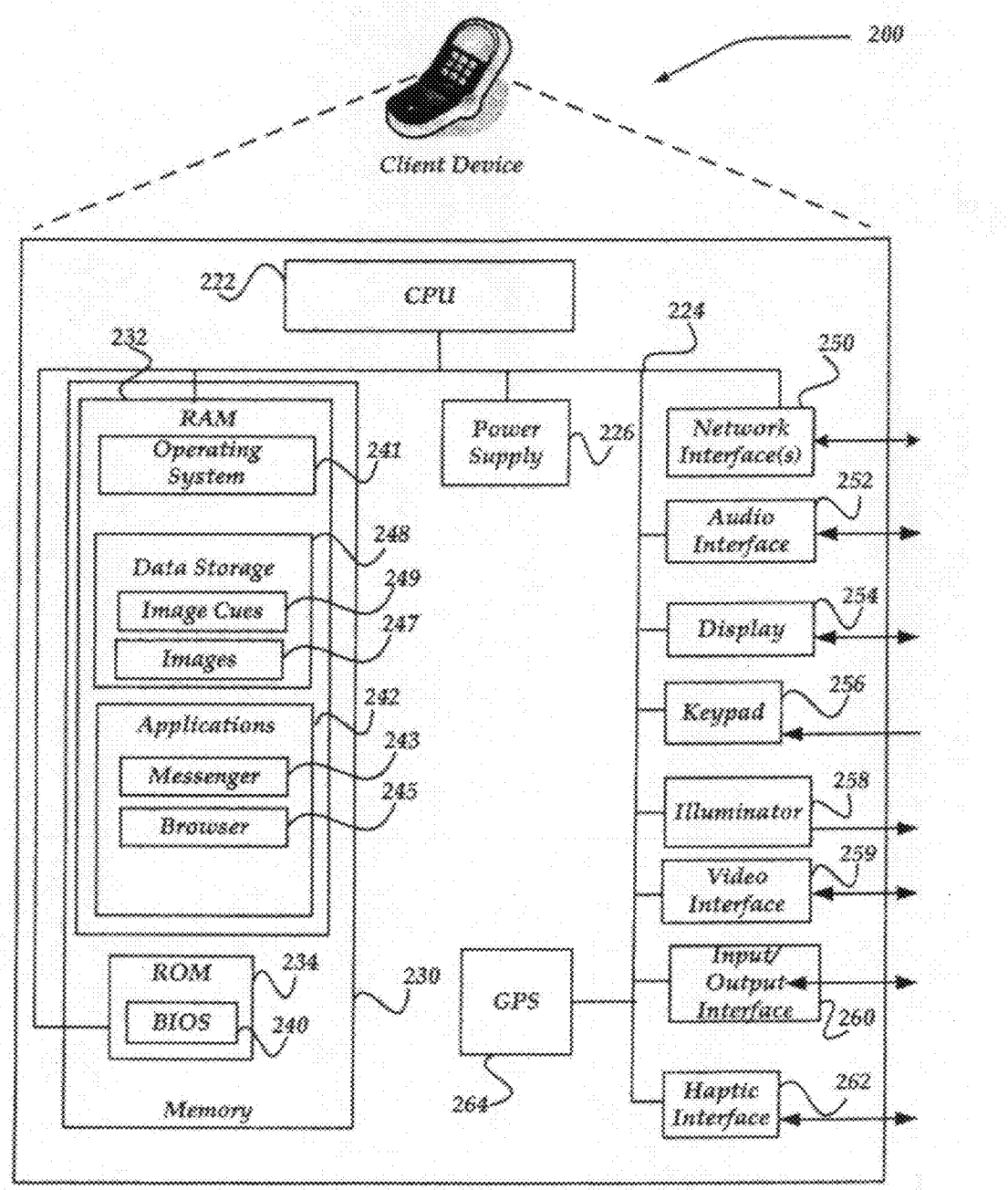
FIG. 2 shows one embodiment of a client device that may be included in the system of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates an example of computer readable storage media (devices) for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200. The information may then be provided to another device based on any of a variety of events, including being sent as part of a header during a communication, sent upon request, or the like. Data storage 248 may also be employed to store social networking information including address books, buddy lists, aliases, user profile information, multimedia content, or the like. Further, as illustrated, data storage 248 may also store messages, web page content, or any of a variety of user generated content. At least a portion of the information may also be stored on a disk drive or other computer-readable storage device (not shown) within client device 200.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. Applications 242 may include, for example, messenger 243 and browser 245.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard. Generalized Markup Language (SMGL), HyperText Markup Language (HTML), eXtensible Markup Language (XML), and the like, to display and send a message. However, any of a variety of other web-based languages may be employed. In one embodiment, browser 245 may enable a user of client device 200 to provide and/or receive content between another computing device for posting, reading, and/or otherwise communicating with another client device. Similarly, browser 245 may enable a user of client device 200 to access one or more search engines to perform various search queries for content, including image content, and/or other multimedia content.

Messenger 243 may be configured to manage a messaging session using any of a variety of messaging communications including, but not limited to email, Short Message Service (SMS), Instant Message (IM), Multimedia Message Service (MMS), interne relay chat (IRC), mIRC, RSS feeds, and/or the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols, including, but not limited to various push and/or pull mechanisms for client device 200. In one embodiment, messenger 243 may interact with browser 245 for managing messages. As used herein, the term "message" refers to any of a variety of messaging formats, or communications forms, including but not limited to email, SMS, IM, MMS, IRC, or the like.

Illustrative Network Device

Figure 3:
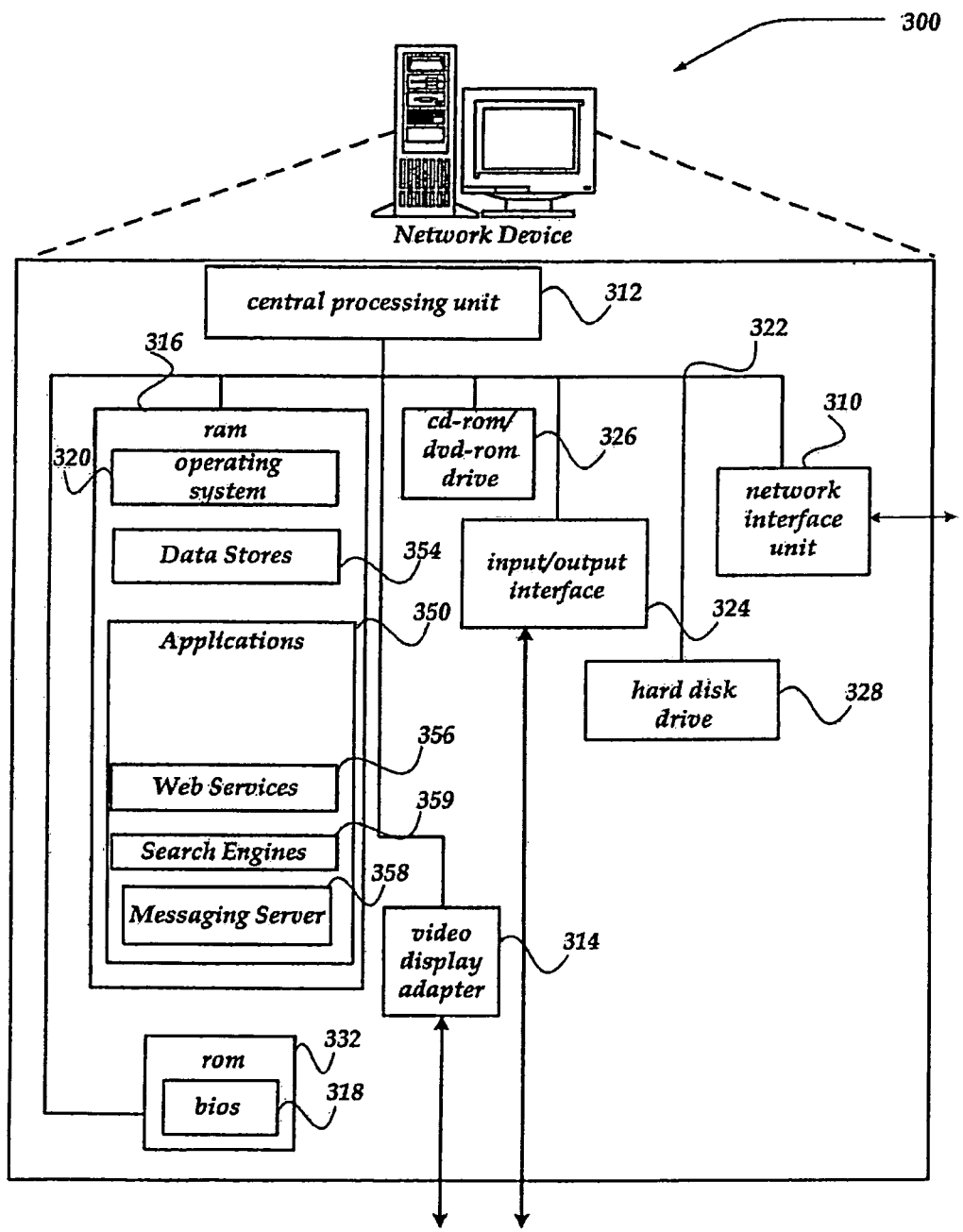
FIG. 3 shows one embodiment of a network device that may be included in the system of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, one of content service devices 107-108, interest processing devices 105-106, and/or matching and ranking devices 117-118.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable/processor-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 354 may include a database, text, spreadsheet, folder, file, or the like, that may be configured to maintain and store user account identifiers, user profiles, email addresses, IM addresses, and/or other network addresses; or the like. Data stores 354 may also store various authoritative scores, citation models, and the like. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Web services 356, messaging server 358, and search engines 359, may also be included as application programs within applications 350.

Messaging server 358 may include virtually any computing component or components configured and arranged to forward messages from message user agents, and/or other message servers, or to deliver messages to a local message store, such as data store 354, or the like. Thus, messaging server 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. Messaging server 358 may also be managed by one or more components of messaging server 358. Thus, messaging server 358 may also be configured to manage SMS messages, IM, MMS, IRC, RSS feeds, mIRC, or any of a variety of other message types. In one embodiment, messaging server 358 may enable users to initiate and/or otherwise conduct chat sessions, VOIP sessions, or the like.

Web services 356 represent any of a variety of services that are configured to provide content, including messages, over a network to another computing device. Thus, web services 356 include for example, a web server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like.

In one embodiment, Web services 356 may receive content, including multimedia content from another network device, such as a client device, or the like. Web services 356 may then enable a user to prepare and/or otherwise manage the content for access by various other users. As such, web services 356 may allow users to manage blog pages, social content sharing sites, or the like. Further, web services 356 may enable various users of client devices to access, read, and even comment on various content. For example, web services 356 may allow a user to identify various content as their favorite content. Similarly, web services 356 may allow a user to copy content from one sight, then using any of a variety of content editing applications, modify the content, and/or post the modified content on another website. Thus, in one embodiment, a user might access, for example, an image from one website, crop or otherwise modify the image, and post the modified image on another site.

Web services 356 may also enable a user to access one or more search engines 359 to perform various search queries for content, including image content, textual content, and/or any of a variety of other multimedia content.

Various embodiments of network device 300 may include further applications 350 to perform various functions discussed herein and/or discussed with regard to steps as illustrates in the flowcharts shown below. For example, certain network devices, such as matching and ranking devices shown herein, may have applications 350 for performing relevance matching and/or engagement ranking, as discussed in greater detail in. Other network devices 300 may include applications for offline modeling and indexing, as discussed in greater detail herein. These stored applications are processor-executable code encoded on a processor-readable medium, which, when executed by CPU 312, enable actions to performed in accordance with the processor-executable code.

Generalized Operation

The operation of certain aspects of the invention will now be described with respect to FIGS. 4-5. The operations of the processes described below for FIGS. 4-5 may, in one embodiment, be performed within one or more network devices, such as matching and ranking device of 117 of FIG. 1.

Figure 4:
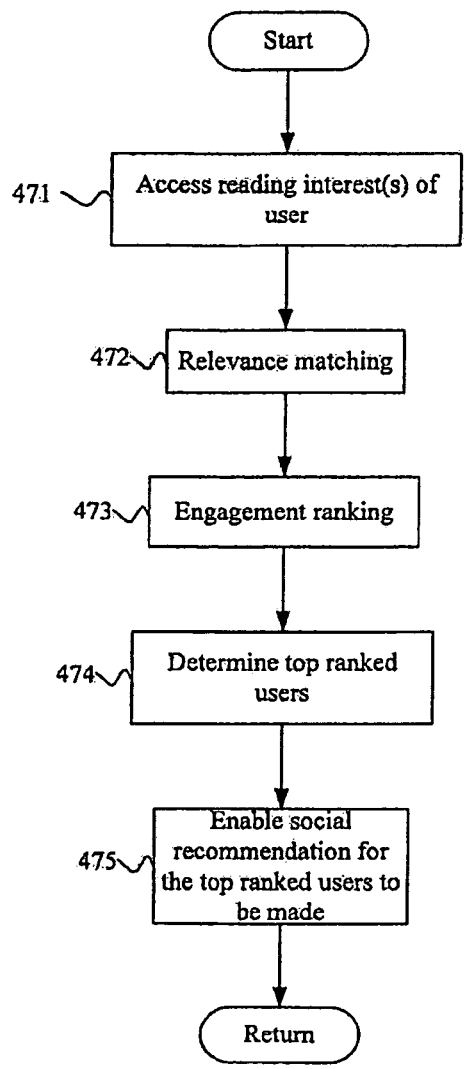
FIG. 4 illustrates a logical flow generally showing one embodiment of an overview process for use in generating social recommendation for users.

FIG. 4 illustrates a logical flow generally showing one embodiment of an overview process (470) for use in generating social recommendation for users. In one embodiment, process 470 may be performed by one or more of matching and ranking devices (e.g. 117 and 118 of FIG. 1). After a start block, the process proceeds to block 471, where information from a user profile index is accessed to determine reading interests of a user. The process then moves to block 472, where relevance matching is performed to determine at least one user having at least one publishing interest that is relevant to the reading interests of the user.

Next, the process advances to block 473, where the matching user(s) are ranked. The process then proceeds to block 474, where, based on the ranking, one or more top ranked users are determined. The process then moves to block 475, where a social recommendation for each of the top ranked matching user(s) is enabled to be made to the user. The process then advances to a return block, where other processing is resumed.

Figure 5:
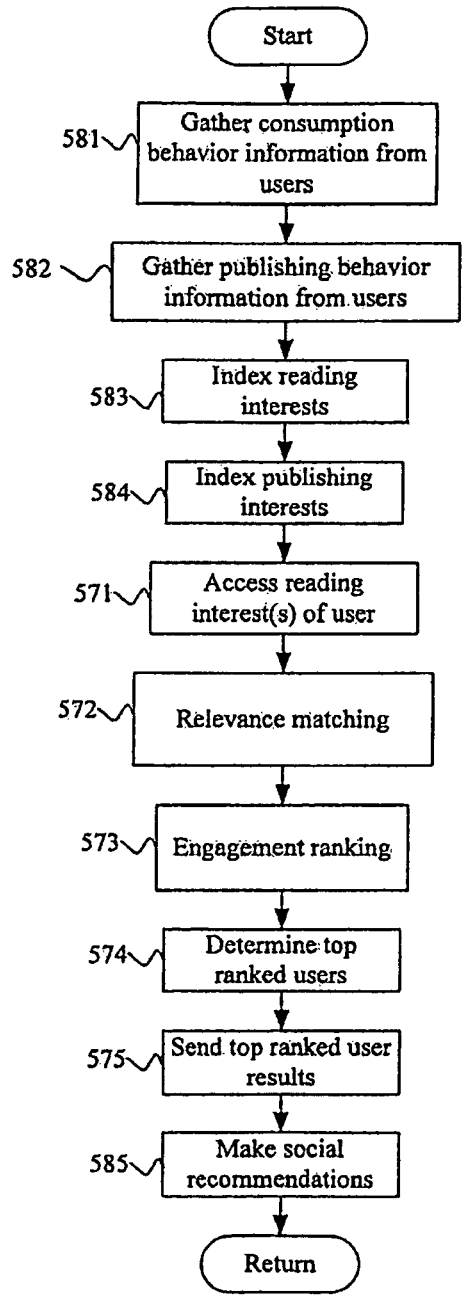
FIG. 5 illustrates a logical flow generally showing an embodiment of the process of FIG. 4, in accordance with aspects of the present invention.

FIG. 5 illustrates a logical flow generally showing an embodiment of process 580, which may be employed as an embodiment of process 470 of FIG. 4. After a start block, the process proceeds to block 581, where information on private/consumption user behavior within at least one network is gathered. Here the behaviors can be various online actions within a social network or across an entire network. This information includes user's consumption behaviors, such as page views, ad view, ad clicks, search queries, and/or the like. In some embodiments, the user's interests may be mined from all of the user's behaviors across entire network, not necessarily restricted to those within a social network. In one embodiment, when a user login into the network, a serving computer (e.g., content service device 107 or 108 of FIG. 1) can get his/her personal identity or simply a browser cookie. In one embodiment, user's content browsing history is represented as a list of records with each record for a particular action. In this embodiment, each record stores a content piece ID and a timestamp to represent what a user viewed at what time.

In some embodiments, the information is gathered by logging the user's activities, for example, when the user is logged into the network, and can also be gathered by partners such as partner networks for which an agreement is reached to provide user's consumption behaviors on those networks. For information logged by the network, it may be gathered, for example, by content service devices (e.g., 107 and 108). The information may be tracked across various properties in some embodiments, and may be linked with information from partners so that all of a user's consumption behavior across various properties and networks may be linked and aggregated.

The process then moves to block 582, where information on public content generated by users is gathered. As with private behaviors, the public behaviors can be various online actions within a social network or across an entire network. Gathered public content include the user's public or publishing behaviors, like blogs, tweets, vitality updates, articles, generated content pieces, and various user generated contents in general.

As with the private information, the public information can be gathered by logging the user's activities, for example, when the user is logged into the network, and can also be gathered by partners such as partner networks for which an agreement is reached to provide user's public behavior on those networks. For information logged by the network, it may be gathered, for example, by content service devices (e.g., 107 and 108). The information may be tracked across various properties in some embodiments, and may be linked with information from partners so that all of a user's public behaviors across various properties and networks may be linked and aggregated.

The process then advances to block 583, where user profiles are generated and indexed for each of the users, where each index includes reading interests for the user. The process then proceeds to block 584, where public behavior of the users to generate publishing interest is indexed for each user. The user consumption behavior (such as page views, ad view, ad clicks, search queries, and/or the like), gathered from step 581 above, is collected, used to determine reading interests, and indexed in step 583. For example, the information may be passed from various content server devices (e.g., 107 and 108) from various properties on the network, as well as information from partners, and passed to interest processing devices 105 and 106 for processing. Likewise, in step 584, the user public behavior (such as blogs, tweets, vitality updates, articles, generated content pieces, and various user generated contents in general) gathered from step 583 above, sent to interest processing devices 105 and 106 and collected there from various sources, is used to determine publishing interests and expertise, and indexed in step 584. With a distributed implementation, interest can be mined from billions of users in steps 583 and 584 (mining reading interests in step 583 and publishing interests in step 584).

Reading interests are treated as queries to be matched to publishing interests in a later step. In one embodiment, the matching can be handled efficiently online by modern information retrieval systems. In another embodiment, for user's stable long term reading interest, this kind of matching can be done offline during steps 583 and 584, which enables obtaining matching results in a subsequent step to be done through a light table look-up in the online stage.

In one embodiment, the interest processing devices create an inverted index of users using their underlying interests as keys. In some embodiments, a content analysis module is used to extract some keywords/entities from content pieces, advertisement creatives/landing pages, or search queries; and users' interest profiles are represented as aggregated keywords/entities frequencies over the users' historic viewed or generated content pieces.

In indexing the publishing interests, not only a determination of the publishing interests but also degree of expertise is tracked to determine users who have expertise in the topic of the publishing interest. This can take into account factors such as number of views, ratings, number of replies, and various factors used to determine the authority of the published content.

In one embodiment, when a user logs in into the network, a serving computer (e.g., content service device 107 or 108 of FIG. 1) can get his/her personal identity or simply a browser cookie. This kind of identity information is used as key to retrieve that user's private reading interest. In some embodiments, a user's reading and publishing interests are represented as a vector whose elements represent that user's corresponding (reading) preference or (publishing) expertise on some topics, like politics, science, entertainment, etc.

Semantic analysis may be used to infer interest from words not literally used in the content. For example, for a blog written about the Iraq war, it may be inferred that "Iraq war" is a publishing interest, and would interest readers with a reading interest of "Iraq war". However, it may also interest readers who have a reading interest of "politics" or "Obama", even though those words do not appear in the article. These are latent semantic topics that may be inferred out by the probabilistic model. In some embodiments of the model, the total of each interest adds to 1. For example, given the user of the key phrase "Iraq war" in the article (conditional probability), the relevant interest in the model could be as "Iraq war" with a probability of 0.5, to be "Obama" with a probability of 0.3, and to be "politics" with a probability of 0.2.

In some embodiments, analyzing content feeds and user generated contents may be accomplished with respect to some semantic topics in an evolving manner. In some embodiment, each piece of content is represented as an unordered bag of "tokens". Content piece can correspond to a news article or a piece of UGC like blog; and tokens are words (with proper stemming and lemmatization processing) in the article or blog. Different topics have different preference over some subsets of tokens. Such kind of preference is represented by high probability of observing specific token conditional on a topic. For example, a topic corresponding to "energy" may have large conditional probability for tokens like "power", "plant", "light", "solar", "electricity", "coal", "water", "dam", etc; while for a topic about "criminal", tokens like "charge", "arrest", "police", "guilty", "plead", "investigation", "attorney" would have higher observation probability. In one embodiment, latent Dirichlet allocation (LDA) is used to infer a set of underlying common topics over pool of content feeds and UGCs in an unsupervised manner, i.e. given a predefined number of topics LDA is applied to derive the probabilistic correspondence between topic and tokens. Such kind of probabilistic correspondence relationships may be stored as a topic model. This model can then be used on new content pieces to infer the underlying topics discussed in that piece of content. In one embodiment, the relevance between content and topics is captured by a probabilistic topic distribution vector whose components represent the normalized (all components are positive and sum to one) strength of specific topic in that piece of content. In some embodiments, the topic distribution vector is properly clipped against a predefined threshold to remove too small components herein. To track the temporal drift or evolution of topics over newly arriving content pieces, in some embodiment, historic count statistics (i.e. number of occurrence between topic and tokens) in LDA topic model is discounted by a factor, $\alpha$; these discounted statistics are then combined with evidences in new content pieces to get a gradually evolved probabilistic topic model.

As previously discussed, in some embodiments, each record or short-term user behavior stores a content piece ID and a timestamp to represent what a user viewed at what time. User's long term interests profile is then constructed as a weighted aggregation of topic distribution vectors of content pieces the user has viewed. The weight is set in an exponentially time-decaying manner, i.e. putting more emphasis on more recent browsing actions. A user's short term interest is represented directly by the topic distribution vector of the content page he or she viewed currently. For each topic, its corresponding numeric value in user interest profile captures the user's interest in that topic. In one embodiment, user's interest pattern may be characterized by a vector whose elements represent the magnitude of corresponding (reading) preference or (publishing) expertise on specific topics:

$$I\_u=[p(i\_1|u),p(i\_2|u),\ldots,p(i\_N|u)]$$

The operations of semantic topics analysis, interest modeling and user profile management may, in one embodiment, be performed within one or more network devices, such as interest processing device of 106 of FIG. 1.

The process then proceeds to block 571, where information from the user profile index is accessed to determine reading interests of a user. For example, the matching and ranking devices 117-118 may access the reading interests by accessing the corresponding user profile stored by interest process devices 105 and 106.

The process then moves to block 572, where relevance matching is performed. In some embodiment, the reading interest of the user is fed as a query into an information retrieval system to match against other social users public interests in the repository. In some embodiments, users reading and publishing interests are represented as a vector whose elements represent that user's corresponding (reading) preference or (publishing) expertise on some topics, like politics, science, entertainment, etc. In the matching stage of step 572, vector similarity measures like cosine similarity can be used as a relevance criterion. In some embodiments, as previously discussed, the relevance matching scores used in previous steps 583 and 584 is calculated offline; in this case, relevance matching of step 572 may be done online through a light table look-up.

Next, the process advances to block 573, where engagement ranking is performed. In this step, the matching user(s) (i.e., the user(s) having the at least one publishing interest that is relevant to the reading interests of the user) are ranked. In some embodiments, representative publishing content pieces of matching user(s) are ranked in addition to or instead of the matching users themselves, but with matching user(s) provided as the ultimate results recommended to users. Ranking can take into account many features to optimize for user response. In some embodiments, they are ranked with some auxiliary information like user demographical information, and/or descriptive statistics for user social connections. The published content pieces for the published interests may be ranked by factors such as the number of user views and clicks to the content, feed quality, freshness, popularity of the relevant published content, and expertise of the user publishing the content on the publishing interest.

The process then proceeds to block 574, where, based on the ranking, one or more top ranked matching users and/or their representative publishing contents are determined. For example the top k ranking results may be determined, where k may be a predetermined integer. The process then moves to block 575, where the determined top k results are sent, so as to enable social recommendations to be made based on the top k results. These top k "results" are the top k matching users (i.e., the users having publishing interests corresponding to the user's reading interests that are ranked the highest). For example, they may be sent to the online content servers (e.g., content service devices 107 and 108 of FIG. 1).

The process then moves to block 585, where social recommendations are provided based on the received top k results. For example, the online content servers (e.g., content service devices 107 and 108 of FIG. 1) may receive the top k results for the user, and then send the user social recommendations based on those top k results. The social recommendations may be suggestions for following or friend relations, for example, recommendations to friend the users, and/or to follow the users. In one embodiment, these results can be shown in one block on the login page, like "Why not follow him/her?" or "Why not make friend with him/her?" In one embodiment, representative publishing content pieces of matching user(s) are also shown as part of recommendation. The recommendations may also be provided in frames, for example off to the side of web pages being navigated, as the user navigates one or more properties in the network while logged into the network. The social recommendations may be made to users of the network while the users are logged onto the network, even to users that are not members of the social network. In this case, the recommendation then also acts as an invitation to join the social network.

The process then advances to a return block, where other processing is resumed. Steps 571 through 585 may be performed separately for each user in order to generate social recommendation(s) for each user based on that user's reading interest(s).

In process 580, through indexing users' publishing interests and treating users' reading interests as queries, social connection recommendations may be handled in an efficient and scalable manner. Such a technology may be applied not only to users within a social network, but also to those users who have not signed in yet. For the former group, social connections may be boosted and actively drive the online community. For the latter group of users, this approach provides a powerful tool to actively connect them to a social environment via matching their implicit interests, to increase adoption for a social network. Overall, process 580 may help drive social network adoption and engagement.

Process 580 goes beyond the conventional social connections as a mirror of real world relationship, and may improve the user stickiness in a social network, by providing users with relevant social suggestions in terms of the user's own reading interests. In this way, social network connections may be boosted based on common interaction interests and form interest-centered cliques in the social environment.

In process 580, a user's interests are mined from all the user's behaviors across entire network, not restricted to those within a social network. For those users not in a social network but having extensive online actions like news (or sports, or finance) page views, searches and ad clicks, process 580 provides a way to enroll them into a social environment; this may be significantly helpful to increase social network adoption by connecting these new users to dedicated social expertise.

Meanwhile, to protect user's privacy, in the friend suggestion process, others' user publishing interests are only exposed as a demonstration of the publishing user's expertise on some areas while keeping all of the consumption or reading interests confidential.

Additionally, since the recommendation is based on user behaviors, it can be used to suggest social connections across several different social networks, which is appealing for social network hubs.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
for each user of a plurality of users:
  accessing, by a processor, a user profile index to determine at least one reading interest of the user;
  gathering, by the processor, publishing data of the plurality of users from publicly available content generated by the plurality of users;
  indexing, by the processor, publishing interests of the plurality of users based on gathered publishing data of the plurality of users, such that the publishing interests include topics generated from key words in the publishing behavior information and latent semantic topics inferred from the publishing behavior information;
  performing, by the processor based on the indexing, relevance matching to determine matching users from the plurality of users such that each matching user has at least one publishing interest that is relevant to at least one reading interest of the user;
  ranking, by the processor, the matching users;
  based on the ranking, determining, by the processor, one or more top ranked matching users; and
  providing, by the processor, suggestions for a social recommendation for each of the one or more top ranked matching users to be made to the user, each of the suggestions for the top ranked matching users comprises respective representative publishing content pieces of each of the top ranked matching users.

2. The method of claim 1, further comprising:
making, by the processor, a suggestion to the user to friend at least one of the one or more top ranked matching users.

3. The method of claim 1, further comprising:
making, by the processor, a suggestion to the user to follow at least one of the one or more top ranked matching users.

4. The method of claim 1, further comprising: gathering, by the processor, consumption behavior information from the plurality of users.

5. The method of claim 4, wherein the consumption behavior information includes at least one of page views, ad views, ad clicks, or search queries.

6. The method of claim 5, wherein the publishing behavior information includes at least one of blogs, tweets, articles, or published user-generated content.

7. The method of claim 1, further comprising:
generating, by the processor, the user profile index by indexing a plurality of users profiles based on gathered consumption behavior from the plurality of users such that the user profile index includes reading interests of the users;
indexing, by the processor, publishing interests of the plurality of users based on gathered publishing data from the plurality of users.

8. The method of claim 7, wherein the indexing of the publishing interests is accomplished such that the publishing interests include topics generated from key words in the publishing behavior information and latent semantic topics inferred from the publishing behavior information by a probabilistic model using latent Dirichlet allocation, and wherein the indexing of the plurality of user profiles is accomplished such that the reading interests employ a weighted aggregation of topic distribution vectors such that the weighting is set in an exponential time-decaying manner.

9. A network device, comprising:
a transceiver that is configured to send and receive data over a network; and
a processor that is configured to perform actions, including for each user of a plurality of users:
  accessing a user profile index to determine at least one reading interest of the user; indexing publishing interests of the user based on gathered publishing data from the user, such that the publishing interests include topics generated from key words in the publishing behavior information and latent semantic topics inferred from the publishing behavior information;
  gathering publishing data of the plurality of users from publicly available content generated by the plurality of users;
  indexing publishing interests of the plurality of users based on gathered publishing data of the plurality of users such that the publishing interests include topics generated from key words in the publishing behavior information and latent semantic topics inferred from the publishing behavior information;

performing based on the indexing, relevance matching to determine matching users from the plurality of users such that each matching user has at least one publishing interest that is relevant at least one reading interest of the user; ranking the matching users;

based on the ranking, determining one or more top ranked matching users; and providing suggestions for a social recommendation for each of the one or more top ranked matching users to be made to the user, each of the suggestions for the top ranked matching users comprises respective representative publishing content pieces of each of the top ranked matching users.

10. The network device of claim 9, wherein ranking the matching users is done based on at least one of: freshness of published content of the matching user, popularity of the published content of the matching user, relevance of the published content of the matching user, expertise of the matching user, demographic information of the user, or at least one descriptive statistic of the user.

11. The network device of claim 9, wherein the relevance matching is accomplished with an information retrieval process and a look-up table.

12. A tangible, non-transitory processor-readable medium having processor-executable code encoded therein, which when executed by one or more processors, enables actions, comprising:

for each user of a plurality of users
 accessing a user profile index to determine at least one reading interest of the user;
 gathering publishing data of the plurality of users from publicly available content generated by the plurality of users;
 indexing publishing interests of the plurality of users based on gathered publishing data from the plurality of users, such that the publishing interests include topics generated from key words in the publishing behavior information and latent semantic topics inferred from the publishing behavior information;
 performing based on the indexing, relevance matching to determine matching users from the plurality of users such that each matching user has at least one publishing interest that is relevant at least one reading interest of the user;
 ranking the matching users;
 based on the ranking, determining one or more top ranked matching users; and
 providing suggestions for a social recommendation for each of the one or more top ranked matching users to be made to the user, each of the suggestions for the top ranked matching users comprises respective representative publishing content pieces of each of the top ranked matching users.

13. The tangible, non-transitory processor-readable medium of claim 12, wherein ranking the matching users is done based on at least one of: freshness of published content of the matching user, popularity of the published content of the matching user, relevance of the published content of the matching user, expertise of the matching user, demographic information of the user, or at least one descriptive statistic of the user.

14. The tangible, non-transitory processor-readable medium of claim 12, wherein the relevance matching is accomplished with an information retrieval process and a look-up table.

15. A system, comprising:
 a plurality of network devices that are configured to perform actions, including:
 for each user of a plurality of users:
  accessing a user profile index to determine at least one reading interest of the user;
  gathering publishing data of the plurality of users from publicly available content generated by the plurality of users;
  indexing publishing interests of the plurality of users based on gathered publishing data of the plurality of users, such that the publishing interests include topics generated from key words in the publishing behavior information and latent semantic topics inferred from the publishing behavior information;
  performing based on the indexing, relevance matching to determine matching users from the plurality of users such that each matching user has at least one publishing interest that is relevant to at least one reading interest of the user;
  ranking the matching users;
  based on the ranking, determining one or more top ranked matching users; and
  providing suggestions for a social recommendation for each of the one or more top ranked matching users to be made to the user, each of the suggestions for the top ranked matching users comprises respective representative publishing content pieces of each of the top ranked matching users.

16. The system of claim 15, wherein the plurality of network devices are configured to perform further actions, including:
 making a suggestion to the user to friend at least one of the one or more top ranked matching users.

17. The system of claim 15, wherein the plurality of network devices are configured to perform further actions, including:
 making a suggestion to the user to follow at least one of the one or more top ranked matching users.

18. The system of claim 15, wherein the plurality of network devices are configured to perform further actions, including:
 generating the user profile index by indexing a plurality of users profiles based on gathered consumption behavior from the plurality of users such that the user profile index includes reading interests of the users;
 indexing publishing interests of the plurality of users based on gathered publishing data from the plurality of users.

19. The system of claim 15, wherein the plurality of network devices are configured to perform further actions, including:
 gathering consumption behavior information from the plurality of users.

20. The system of claim 19, wherein the plurality of network devices are further configured such that the consumption behavior information includes at least one of page views, ad views, ad clicks, or search queries, and wherein the publishing behavior information includes at least one of blogs, tweets, articles, or published user-generated content.

* * * * *